Nov. 20, 1962  W. S. BERRY  3,064,293
SEWER AND PIPE CLEANER
Filed Feb. 2, 1961
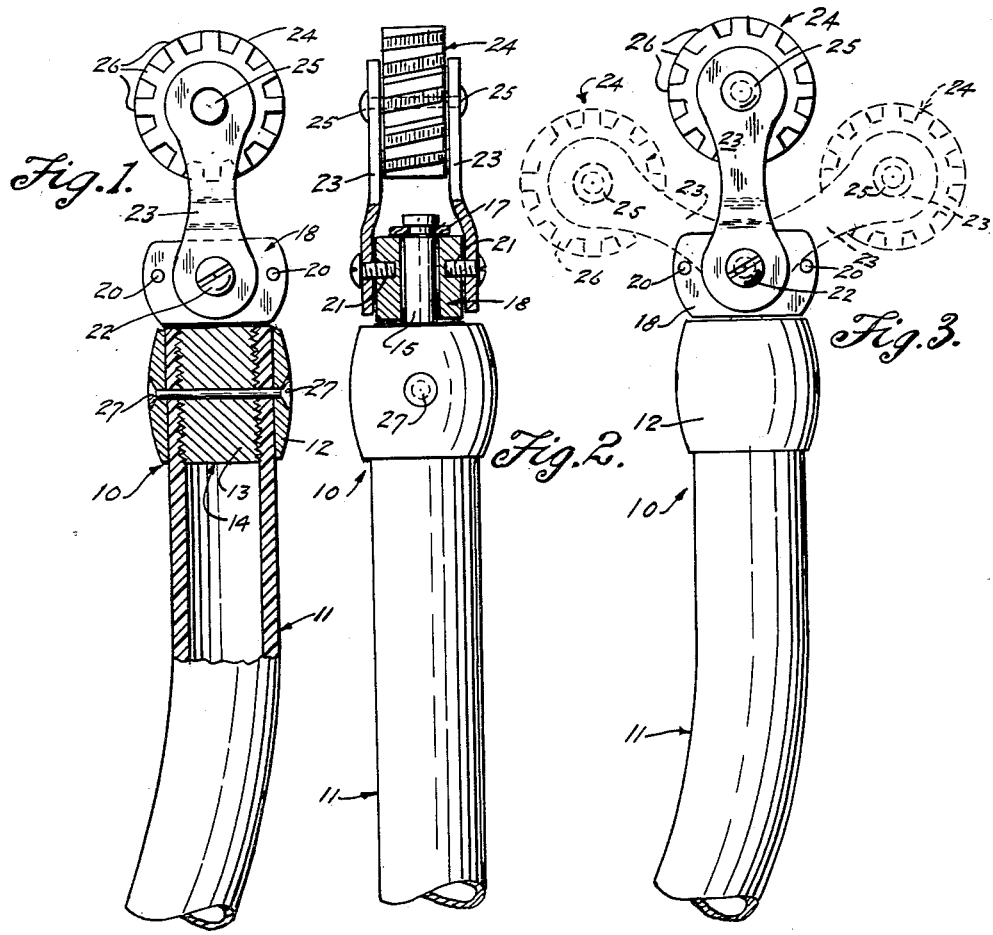
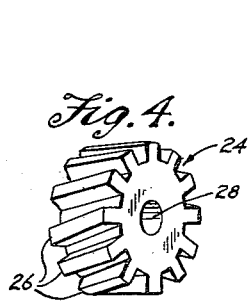
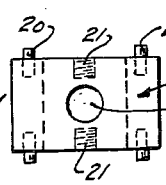
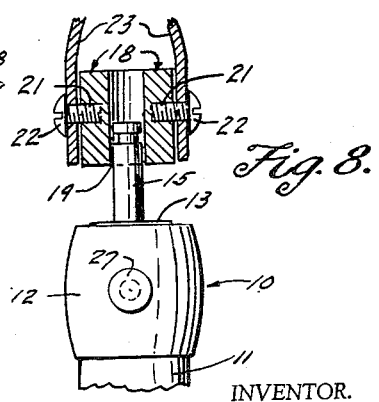
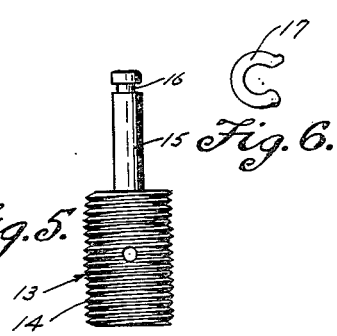
INVENTOR.
William S. Berry
BY
Victor J. Evans & Co.
ATTORNEYS.

United States Patent Office 3,064,293
Patented Nov. 20, 1962

3,064,293
SEWER AND PIPE CLEANER
William S. Berry, 55 Whitney Place, Buffalo 1, N.Y.
Filed Feb. 2, 1961, Ser. No. 86,661
4 Claims. (Cl. 15—104.3)

The present invention relates to a tool which is especially suitable for cleaning out clogged drain pipes, sewer lines or the like.

An important object of the present invention is to provide a snake and sewer cleaner which is adapted to be readily manually manipulated in order to cause a cutter to move through a pipe or line whereby the material or substances clogging the line can be readily cut so as to unblock the line in order to permit normal use of the line, and wherein the tool of the present invention can be used over and over again as desired.

Another object is to provide a hand operated snake and sewer cleaner which includes a rotary cutter that is provided with cutting teeth thereon, and wherein the cutter is pivotally or swivelly supported so that it can readily travel through curved sections of pipe in order to facilitate the unstopping of clogged drains, pipe lines or the like.

Another object is to provide a device of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is an elevational view of the snake and sewer and pipe cleaner of the present invention, and with parts broken away and in section.

FIGURE 2 is a view taken at right angles to the view shown in FIGURE 1, and with parts broken away and in section.

FIGURE 3 is a fragmentary elevational view illustrating the different positions that the cutter can assume as for example so as to permit the device to move or travel through irregular shaped or curved pipe lines or the like.

FIGURE 4 is a perspective view of the cutter.

FIGURE 5 is an elevational view of the support member.

FIGURE 6 is a plan view of the retainer or clip.

FIGURE 7 is a plan view of the base element per se.

FIGURE 8 is a fragmentary elevational view, with parts broken away and in section, showing the method of assembling or disassembling the device.

Referring in detail to the drawings, the numeral 10 indicates the snake or tool of the present invention which is shown to comprise a flexible snake 11 that has a fitting or nipple 12 mounted on an end thereof, FIGURE 1. The numeral 13 indicates a support member which includes a threaded body portion 14 that is arranged in threaded engagement with an inner end of the snake 11, and the support member 13 further includes an integral pin or stud 15 which is provided with a recess or groove 16 adjacent one end thereof, FIGURE 5. The numeral 17 indicates a clip or retainer which is adapted to be arranged in engagement with the groove 16 so as to help maintain the parts in their proper assembled position.

As shown in FIGURE 7, there is provided a base element which is indicated generally by the numeral 18, and the base element 18 is provided with a central aperture or opening 19 through which extends the stud 15. Stop pins 20 are suitably affixed to or formed integral with the base element 18, and the stop pins 20 are adapted to be used for limiting swinging movement of the arms or links 23 as later described in this application. The arms 23 are pivotally connected to the base element 18 by means of securing elements or pivot pins 22 which extend through end portions of the arms 23 and which are adapted to threadedly engage threaded openings 21 in the base element 18.

The numeral 24 indicates a cutter or wheel which is of a small size and for example the cutter 24 is no larger in cross section than the fitting 12 whereby the cutter can be moved through small pipes or the like, as for example by making the various parts quite small in size. The cutter 24 is journaled between the pair of arms 23 by means of the pin or axle 25, and the cutter 24 is provided with a plurality of angularly arranged cutting pieces 26, FIGURE 4.

As shown in the drawings, the base element 18 has the opening 19 therein for the projection therethrough of the stud 15, and this construction permits the base element 18 and cutter 24 to swivel or pivot on the stud 15. In addition, due to the provision of the pivot pins 22, the arms 23 and cutter 24 can pivot or move back and forth as for example from the solid line position shown in FIGURE 8 to the dotted line position of FIGURE 3 and this arrangement permits the snake and cutter to readily move through irregular shaped pipe lines, conduits or the like.

The numeral 27 indicates a securing element or rivet which extends through the fitting 12, and through a portion of the flexible snake 11 and through the body portion 14 of the support member 13 so as to maintain these parts properly secured or connected together.

As shown in FIGURE 4, the cutter 24 is provided with a central opening or aperture 28 for the projection therethrough of the mounting pin or axle 25.

From the foregoing, it is apparent that there has been provided a hand tool which is especially suitable for cleaning out clogged drains, lines or the like, and with the parts arranged as shown in the drawings, it will be seen that the snake or line 11 which has a flexible construction so as to permit the same to readily snake through irregular shaped pipe lines or the like, can be utilized to accomplish the desired results. Thus, by manually holding and moving the snake 11, the tool 10 can be moved through the line or sewer to be cleaned, and the cutter 24 is arranged and constructed so that its teeth 26 are adapted to cut whatever the material is that is clogging or blocking the line so that the line can be freed to permit normal use thereof. The cutter 24 is rotatable between the arms 23 due to the provision of the pin 25, and in addition the arms 23 can pivot on the pins 22 so that the cutter can follow the contour of various shaped pipe lines or the like. The pins 20 act as stop members to limit pivotal movement of the arms 23 which carry the cutter 24.

The securing element 27 extends through the fitting 12 and through the portion 14 of the support member 13 so as to maintain the support member 13 properly and securely fastened in the end of the flexible snake 11. The pin 15 extends through the opening 19 and this construction permits the base element to swivel or rotate on the pin 15. However, the retainer 17 serves to prevent accidental disengagement of the base element and its associated parts from the pin or stud 15. When it is desired to disassemble the device, the retainer 17 can be disengaged from its groove 16 so that for example as shown in FIGURE 8 the base element 18 can be separated from the stud 15, as for example when a different type of cutter is to be mounted thereon.

The parts can be made of any suitable material and in different shapes or sizes.

It is to be noted that the arms 23 can swing back and forth limited only by the stop members 20, so that a type of moving action will be provided for the cutter 24 which will facilitate the cutting through of the material that is blocking or clogging the pipe line or sewer or the like.

The cutter 24 is preferably no larger in cross section than the fitting 12 so that for example by making the fitting 12 and flexible line 11 of a small size, the entire tool can be used in unclogging small diameter pipes or the like.

It will therefore be seen that there has been provided a sewer cleaner which is especially suitable for cleaning clogged drains as for example when drains become clogged from hardened grease. The present invention is constructed so that the tool 10 will not have its parts accidentally catch in the rims and crevices of the sewer or line, and wherein the tool of the present invention can be easily and conveniently navigated a considerable distance down the drain pipe. The tool is easy to use and in fact can be readily used by women in cleaning out grease or the like from drain lines. It is only necessary to push on the snake and the cutter 24 will roll down the drain easily and at the same time cuts its way through the grease. The flexible member 11 may consist of a plastic tubing, coil spring or the like. The cutter 24 is mounted so that it can roll and at the same time can swing back and forth in several different directions so as to facilitate the action of the cutter in cutting through the grease or other material. The tool of the present invention is further characterized by the absence of nuts, bolts and the like which have a tendency to retard the movement of such a snake through bends of the sewer joints, and the tool of the present invention can be made quite small so that it can enter the sewer from the kitchen sink or bowl. The tool can readily navigate the various bends in the lines and the tool is inexpensive to make and ruggedly constructed so that the same will give long periods of efficient and economical use. The snake of the present invention is constructed so that the cutter can not only revolve, but it can also swivel back and forth as for example from the solid line position of FIGURE 3 to the broken line position in FIGURE 3 and vice versa. This permits the tool to adjust itself to any angle desired or required as the tool moves through the pipe being cleaned. The stop members 20 on each side of the block or base element 18 serve to regulate or limit the movement of the arms 23. The cutter 24 is a wheel which functions as a cutter or scraper, and the cutter may have a suitable construction as for example it may have a knurled edge instead of the teeth in order to perform the desired cutting action. An important aspect or feature of the present invention is the means of mounting the cutter so as to permit the cutter to move to any desired angle while rotating and rolling at the same time, and the flexible cable 11 will follow the cutter easily around all bends and curves so as to facilitate the job of reaching obstructions in a sewer joint. The tool has a construction which is rugged and simple so as to permit the desired cleaning out of the lines to be readily accomplished. The inner portion 14 of the support member 13 is threaded so as to permit the support member 13 to be firmly affixed to the tubing or cable 11.

The present invention is especially suitable for use by a housewife or the like since a housewife will be able to clean and open clogged drains without disconnecting pipes below the sink so that the tool can pass through the small trap located about two inches inside the opening at the sink. Larger models can be made for the use of plumbers to do heavy duty work, and the tool of the present invention is constructed so that the cutter can crawl, and also rotate, and the arms can swing back and forth to permit the tool to penetrate bends, curved sections of pipe or the like. In addition the tool of the present invention does not utilize nuts, bolts or the like so that there will be no interference with the tool traveling around bends or curved surfaces, and also by eliminating such nuts and bolts, there will be less likelihood of debris or the like accidentally catching on such nuts and bolts.

Minor changes in shape, size and rearrangement of details coming within the field of invention claimed may be resorted to in actual practice, if desired.

What is claimed is:

1. In a sewer and pipe cleaner, a flexible snake, a fitting mounted on an end of said snake, a support member including a threaded body portion threaded in an end of said snake, a securing element extending through said fitting and snake and body portion; said support member including a stud provided with a groove adjacent its outer end, a base element provided with a central aperture for the projection therethrough of said stud, a retainer arranged in engagement with the groove in said stud and said retainer adapted to engage the outer end portion of said base element, a pair of spaced apart arms pivotally connected to said base element, and a cutter journaled between said arms.

2. In a sewer and pipe cleaner, a flexible snake, a fitting mounted on an end of said snake, a support member including a threaded body portion threaded in an end of said snake, a securing element extending through said fitting and snake and body portion; said support member including a stud provided with a groove adjacent its outer end, a base element provided with a central aperture for the projection therethrough of said stud, a retainer arranged in engagement with the groove in said stud and said retainer adapted to engage the outer end portion of said base element, a pair of spaced apart arms pivotally connected to said base element, a cutter journaled between said arms, and a plurality of spaced apart stop pins on said base element for selective engagement by said arms.

3. In a sewer and pipe cleaner, a flexible snake, a fitting mounted on an end of said snake, a support member including a threaded body portion threaded in an end of said snake, a securing element extending through said fitting and snake and body portion; said support member including a stud provided with a groove adjacent its outer end, a base element provided with a central aperture for the projection therethrough of said stud, a retainer arranged in engagement with the groove in said stud and said retainer adapted to engage the outer end portion of said base element, a pair of spaced apart arms pivotally connected to said base element, a cutter journaled between said arms, a plurality of spaced apart stop pins on said base element for selective engagement by said arms, said cutter including a plurality of angularly arranged cutting teeth, and said cutter being no larger in cross section than said base element and fittings.

4. A sewer and pipe cleaner comprising a flexible snake, a support member connected to said snake, a base element swivelly connected to said support member, a pair of arms pivotally connected to said base element, stop members on each side of the base element for limiting movement of the arms, and a cylindrical cutter journaled between said arms.

References Cited in the file of this patent

UNITED STATES PATENTS

| | | |
|---|---|---|
| 856,627 | Elliott | June 11, 1907 |
| 1,140,047 | Lewis | May 18, 1915 |